UNITED STATES PATENT OFFICE.

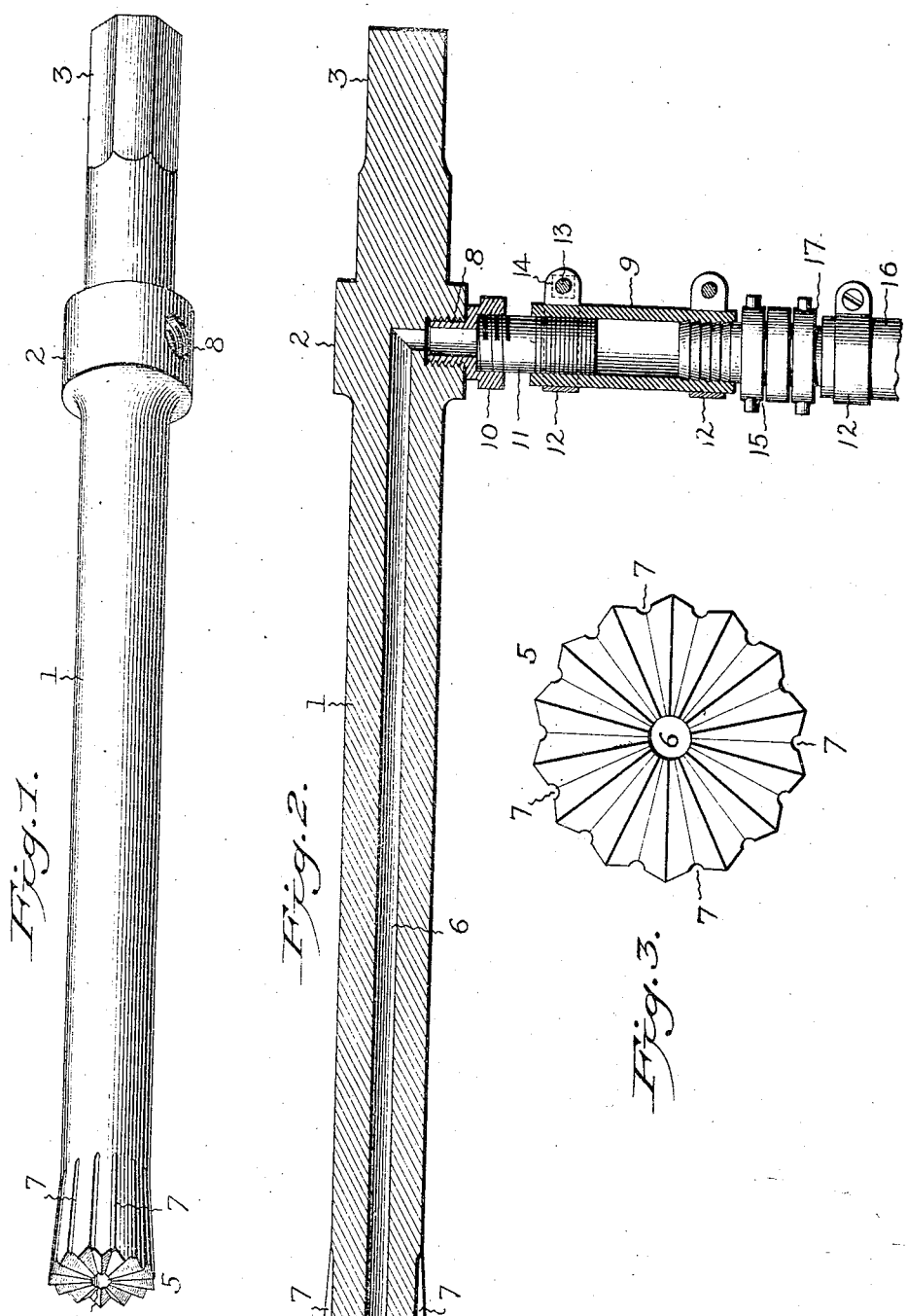

CHARLES HENRY SHAW, OF DENVER, COLORADO.

WATER OR AIR FEED SIDE-INLET DRILL-BIT.

No. 801,480.　　　　Specification of Letters Patent.　　　　Patented Oct. 10, 1905.

Application filed October 10, 1904. Serial No. 227,889.

*To all whom it may concern:*

Be it known that I, CHARLES HENRY SHAW, a citizen of the United States of America, residing in the city and county of Denver and State of Colorado, have invented certain new and useful Improvements in Water or Air Feed Side-Inlet Drill-Bits; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in rock-cutting drill-bits; and the object of my invention is to provide a side-inlet water and air feed rock-cutting drill-bit provided with an enlarged circular rock-cutting head which contains a circular row of rock-cutting lips and that is adapted to be used in rock-drilling engines to drill holes in either wet or talcky or dry rock. I attain this object by the mechanism illustrated in the accompanying drawings, in which—

Figure 1 is a perspective view of a drill-bit embodying my invention. Fig. 2 is a section of Fig. 1, and Fig. 3 is an end elevation of the rock-cutting head.

Similar numerals of reference refer to similar parts throughout the several views.

Referring to the drawings, the numeral 1 designates the shank of the drill-bit. 2 designates a collar that is formed integral with the shank at a short distance from the hammer-striking end of the shank. The striking end 3 is formed into a square or hexagon or other polygonal shape for preferably a short distance from its end, and the remainder of the distance from the hammer-striking end to the collar is preferably of round form. The rock-cutting end comprises an enlarged circular head portion 5, the end or face of which is formed at substantially right angles to the axis of the drill-bit. Its outer periphery is larger in diameter than the shank portion and tapers convergingly back to and blends into the shank. The shank is provided with an axial hole 6, that extends into it from its rock-cutting end to opposite its collar portion, and in the face of the head a circumferential row of V-shaped rock-cutting lips are formed which radiate from the peripheral edge of its axial aperture to the peripheral edge of the head. These rock-cutting lips are placed close together, and I preferably use about fourteen in a drill-bit that will drill an inch-and-an-eighth hole.

At the periphery of the head between each two lips a groove 7 is formed that extends along the tapering slope of the head a short distance, through which the rock-dust and cuttings work to the rear of the head. Transversely into the collar 2 at substantially right angles to the axial aperture in the drill-bit I drill a hole 8, which intersects the axial aperture 6. The hole 8 forms a side inlet into the axial aperture of the drill-bit, and it is internally threaded. A flexible water or air conveying tube hose or conduit 9 is then connected at one end in any suitable manner and by any suitable means to this threaded side inlet, the opposite end of which is connected to a supply of water under pressure or to a supply of air under pressure. I preferably use a hose for conveying water or air to the drill-bit, and I preferably arrange and connect the hose to the threaded inlet in the following manner: In the threaded inlet I screw a hardened-steel reducer 10, in the outer end of which I screw one end of a nipple 11, the opposite end of which is inserted in one end of a short piece of hose and is secured there by a clamping-band 12, the ends of which are provided with a screw-driver-head screw 13, which extends through them and a nut 14, the clamping-band and its screw and nut being arranged to clamp the hose tight to the nipple. In the opposite end of this short piece of hose I place the end of one half of a union or hose coupling 15 and secure it to the hose by another clamping-band 12. Then in the end of a hose 16 I secure by a clamping-band 12 the end of the opposite half of a union or hose coupling 17, which connects to the half 15, and the opposite end of the hose 16 leads to a source of water or air under pressure. I employ the hardened reducers to save the threads in the inlet in the drill-bit, and I employ a short piece of hose attached directly to the reducer, because it is elastic and pliable and yields under very rapid vibration of the drill-bit, and I couple the main length of hose to the short piece of hose, as it is necessary to uncouple and couple the long hose every time a drill-bit is changed. The reducer and the short piece of hose makes a very light weight between the drill-bit and the main length of hose.

My improved drill-bit is adapted to be removably clamped at its shank end to any type of rock-drilling engine which is arranged to partially rotate it or to impart to it an oscillating motion while it is drilling into rock, as it is not adapted to a full consecutive rotary motion, and it is particularly adapted to be used in the rock-drilling engine embodied in my application for a patent now pending, Serial No. 225,147, filed September 19, 1904. When drilling holes in wet or talcky rock, a stream of water is kept flowing through the hose into the side inlet of the drill-bit and through its axial aperture and washes the mud or sticky rock-cuttings out of the hole as it is being drilled, and when drilling holes in dry rock a supply of air under pressure from a source of supply is kept flowing through the hose into the side inlet of the drill-bit and through its axial aperture and blows the rock-cuttings out of the hole as it is being drilled.

The large number of rock-cutting lips I employ enables my drill-bit to cut fast and to cut even and smooth holes and at the same time to wear a long time, as the drill-bit does not become dull until all of the cutting-lips are dull.

Having described my invention, what I claim as new, and desire to secure by Letters Patent, is—

1. In a rock-cutting drill-bit, the combination with a drill-bit comprising a shank portion having one end adapted to be operatively supported in a rock-drilling engine, and having its opposite end provided with a circular row of rock-cutting lips, a water or air passage extending into said drill-bit from its rock-cutting lips end to near its opposite end and a threaded water and air inlet aperture extending into the side of said shank portion and connecting with said passage-way, of a reducer threaded at one end to said threaded inlet, a nipple secured to said reducer and a hose connected at one end to said nipple and having its opposite end extend to a source of water or air under pressure, substantially as described.

2. In a rock-cutting drill-bit, a shank portion provided with a polygonal form at its hammer-striking end for a short distance from its end, a collar formed on said shank portion adjacent to its hammer-striking end, an enlarged circular divergingly-tapering head portion on said drill-shank having its face end formed substantially at right angles to the axis of said shank, an axial aperture through said drill-bit extending from its rock-cutting end to said collar, a threaded inlet-aperture extending into the side of said drill-bit and arranged to intersect said axial aperture, and a circular row of V-shaped rock-cutting lips formed in the face of said head radiating from the periphery of said axial aperture to the periphery of said head, substantially as described.

3. In a rock-cutting drill-bit, a shank portion provided with a polygonal form at its hammer-striking end and for a short distance from its end, a collar formed on said shank portion adjacent to its hammer-striking end, an enlarged circular divergingly-tapering head portion on said drill-shank having its face end formed substantially at right angles to the axis of said shank, an axial aperture partially through said drill-bit, provided with a side inlet, a circular row of V-shaped rock-cutting lips formed in the face of said head radiating from the periphery of said axial aperture to the periphery of said head and a groove in the peripheral surface of said head between each pair of rock-cutting lips, substantially as described.

4. In a rock-cutting drill-bit, a round shank portion provided with a hexagon surface for a short distance at and extending from its hammer-striking end, a round portion adjacent to said polygonal surface, a collar encircling said shank and formed integral therewith, and positioned on the round portion of said shank at a short distance from said polygonal portion, a threaded inlet-aperture extending into said collar, an enlarged circular outwardly-diverging tapering head portion on said drill-shank having its face end formed substantially at right angles to the axis of said shank, an axial aperture through said drill-bit extending from its rock-cutting end to the threaded inlet in said collar, a circular row of V-shaped rock-cutting lips formed in the face of said head radiating from the periphery of said axial aperture to the periphery of said head and a groove in the peripheral surface of said head between each pair of rock-cutting lips, substantially as described.

5. In a rock-cutting drill-bit, the combination with the shank provided with rock-cutting lips and a water or air passage-way extending into it from its rock-cutting lips and having a threaded side-inlet aperture in the shank connecting with said passage-way, of the reducer threaded to said threaded inlet, the nipple threaded at one end to said reducer, the short piece of hose connected to the opposite end of said nipple, a main length of hose connected at one end to a supply of water or air under pressure and coupled at its opposite end to said short piece of hose, substantially as described.

In testimony whereof I affix my signature in presence of two witnesses.

CHARLES HENRY SHAW.

Witnesses:
G. SARGENT ELLIOTT,
N. A. DE VERE.